(12) United States Patent
Collison et al.

(10) Patent No.: US 11,046,500 B2
(45) Date of Patent: Jun. 29, 2021

(54) INSULATED SHIPPING SYSTEM INCLUDING ONE-PIECE INSULATIVE INSERT WITH STRENGTHENING INNER LAYER

(71) Applicant: MP Global Products, L.L.C., Norfolk, NE (US)

(72) Inventors: Chad A. Collison, Pierce, NE (US); Reid Borgman, Norfolk, NE (US)

(73) Assignee: MP Global Products, L.L.C., Norfolk, NE (US)

(*) Notice: Subject to any disclaimer, the term of this patent is extended or adjusted under 35 U.S.C. 154(b) by 27 days.

(21) Appl. No.: 16/394,373

(22) Filed: Apr. 25, 2019

(65) Prior Publication Data

US 2019/0248573 A1 Aug. 15, 2019

Related U.S. Application Data

(63) Continuation-in-part of application No. 15/911,726, filed on Mar. 5, 2018, now Pat. No. 10,273,073, which is a continuation of application No. 15/439,387, filed on Feb. 22, 2017, now Pat. No. 9,908,684, which is a continuation of application No. 14/266,156, filed on Apr. 30, 2014, now Pat. No. 9,611,067.

(Continued)

(51) Int. Cl.
*B65D 81/38* (2006.01)
*B65D 5/49* (2006.01)
*B65D 81/127* (2006.01)
*B65D 1/26* (2006.01)
*B65D 81/28* (2006.01)
*B65D 5/56* (2006.01)
*B65D 81/26* (2006.01)

(52) U.S. Cl.
CPC ..... *B65D 81/3858* (2013.01); *B65D 5/48038* (2013.01); *B65D 5/566* (2013.01); *B65D 81/127* (2013.01); *B65D 81/264* (2013.01); *B65D 81/28* (2013.01); *B65D 81/3823* (2013.01); *B65D 81/3862* (2013.01); *Y02W 90/10* (2015.05); *Y10T 428/1307* (2015.01)

(58) Field of Classification Search
CPC ............ B65D 81/3858; B65D 5/48038; B65D 5/566; B65D 81/127; B65D 81/264; B65D 81/28; B65D 81/3823; B65D 81/3862; Y02W 90/10; Y10T 428/1307
USPC ........................................ 206/521-594, 427
See application file for complete search history.

(56) References Cited

U.S. PATENT DOCUMENTS

1,868,996 A 7/1932 Paul
3,222,843 A 12/1965 Schneider
(Continued)

*Primary Examiner* — Chun Hoi Cheung
(74) *Attorney, Agent, or Firm* — Harness, Dickey & Pierce, P.L.C.

(57) ABSTRACT

An insulative insert for a shipping container includes at least one insulative pad and an inner layer. The at least one insulative pad is formed from fibers of a first material having a first strength. The first material includes at least one of cellulose and synthetic polymer. The inner layer is formed from a second material having a second strength that is greater than the first strength. The inner layer is joined to the at least one insulative pad to form the insulative insert. The insulative insert is configured to lie flat in an unfolded position and to form a cube shape in a folded position.

17 Claims, 8 Drawing Sheets

Related U.S. Application Data (60) Provisional application No. 61/817,369, filed on Apr. 30, 2013.

(56) References Cited

U.S. PATENT DOCUMENTS

| | | | |
|---|---|---|---|
| 4,905,835 A | 3/1990 | Pivert et al. | |
| 4,953,705 A | 9/1990 | Evamy | |
| 5,226,557 A * | 7/1993 | Nelson | F16L 59/024 |
| | | | 206/523 |
| 5,340,632 A | 8/1994 | Chappuis | |
| 5,624,035 A * | 4/1997 | Kim | B65D 81/052 |
| | | | 206/521 |
| 6,000,545 A * | 12/1999 | Smith | B65D 81/056 |
| | | | 206/320 |
| 6,085,909 A | 7/2000 | Lyons | |
| 6,092,651 A * | 7/2000 | Miller | B65D 81/113 |
| | | | 206/305 |
| 6,092,661 A | 7/2000 | Mogil | |
| 6,431,361 B1 | 8/2002 | Wolf | |
| 6,875,486 B2 | 4/2005 | Miller | |
| 6,910,582 B2 | 6/2005 | Lantz | |
| 7,094,192 B2 | 8/2006 | Schoenberger et al. | |
| 7,229,677 B2 | 6/2007 | Miller | |
| 7,238,403 B2 | 7/2007 | Koslow et al. | |
| 7,452,316 B2 * | 11/2008 | Cals | B65D 81/127 |
| | | | 206/591 |
| 7,913,847 B2 | 3/2011 | Kasboske | |
| 8,763,886 B2 | 7/2014 | Hall | |
| 9,908,684 B2 | 3/2018 | Collison | |
| 10,357,936 B1 | 7/2019 | Vincent et al. | |
| 2001/0050237 A1 | 12/2001 | Hacikyan | |
| 2008/0141620 A1 | 6/2008 | Szabo | |
| 2009/0193765 A1 | 8/2009 | Lantz | |
| 2009/0283578 A1 | 11/2009 | Miller | |
| 2010/0072105 A1 | 3/2010 | Glaser et al. | |
| 2011/0114513 A1 | 5/2011 | Miller | |
| 2011/0185682 A1 * | 8/2011 | Rockwell | B65D 81/3888 |
| | | | 53/461 |
| 2011/0311758 A1 | 12/2011 | Burns et al. | |
| 2012/0031957 A1 | 2/2012 | Whitaker | |
| 2012/0145568 A1 | 6/2012 | Collison et al. | |
| 2014/0319018 A1 | 10/2014 | Collison | |
| 2017/0341847 A1 | 11/2017 | Chase et al. | |
| 2017/0369226 A1 | 12/2017 | Chase et al. | |
| 2019/0270572 A1 | 9/2019 | Collison et al. | |
| 2019/0270573 A1 | 9/2019 | Collison et al. | |
| 2020/0071056 A1 | 3/2020 | Henderson et al. | |

* cited by examiner

INSULATED SHIPPING SYSTEM INCLUDING ONE-PIECE INSULATIVE INSERT WITH STRENGTHENING INNER LAYER

CROSS-REFERENCE TO RELATED APPLICATIONS

The present disclosure is a continuation-in-part of U.S. patent application Ser. No. 15/911,726, filed Mar. 5, 2018, which is a continuation of U.S. patent application Ser. No. 15/439,387 (now U.S. Pat. No. 9,908,684), filed Feb. 22, 2017, which is a continuation of U.S. patent application Ser. No. 14/266,156 (now U.S. Pat. No. 9,611,067), filed Apr. 30, 2014, which claims the benefit of U.S. Provisional Application No. 61/817,369, filed Apr. 30, 2013. The entire disclosures of the above applications referenced above are incorporated herein by reference.

FIELD

The present disclosure relates to an insulative packaging system and, more particularly, to an insulative packaging system utilizing a chopped fiber insulative pad incorporating antimicrobial and absorbtive powders.

BACKGROUND

This section provides background information related to the present disclosure which is not necessarily prior art.

The current technology provides paper mailers, lined with plastic bubble-wrap, or more expensive foam, or foam-lined boxes. These products are used primarily for shipping sensitive or fragile items, but suffer from the fact that they have extremely limited cushioning, no absorption properties, no antimicrobial properties, and practically no temperature-control value.

Foam, or foam-lined boxes are also used for shipping temperature-sensitive products such as medical samples, pharmaceuticals, chocolates, etc. These current products, in addition to being dramatically more expensive to purchase, warehouse, and ship (in-bound and outbound freight), are also more labor intensive, less user-and-environmentally friendly, and provide very limited protection during transit. Often these shipping containers utilize a significant amount of dry ice to maintain key low temperatures to prevent spoilage.

SUMMARY

This section provides a general summary of the disclosure, and is not a comprehensive disclosure of its full scope or all of its features.

According to the present teachings, an insulative packing system for bottles is disclosed. The system contains a plurality of corrugated members that interleave to form a plurality of bottle holding cavities. The system utilizes an insulative pad formed of a textile pad disposed within a polymer film sleeve. The insulative pad is disposed around the bottle holding cavities. The insulative pad has a textile pad having chopped fibers selected from the group polyester, nylon, acrylic, cotton, polypropylene, denim and combinations thereof. The textile pad has powder antimicrobials while the polymer film has biodegradable enhancers added therein.

According to the present teachings, an insulative packaging system has a shipping container, a plurality of corrugated members that interleave to form a plurality of bottle holding cavities, a three layered polymer film laminate container having an interior surface, and a textile padding disposed within the polymer film laminate container. The textile pad is disposed within the container and the polymer film and is formed of chopped fibers selected from the group polyester, nylon, acrylic, cotton, polypropylene, denim and combinations thereof. The textile pad further has microbial and super-absorbent powders disposed adjacent to an exterior surface of the textile pad or within.

An insulative packing system is presented having a box structure. Disposed within the box is a first U-shaped insulative member disposed against the box bottom and a first pair of box sides. Disposed above the insulative member is a plurality of interleaved members which form a plurality of bottle holding cavities. A second U-shaped insulative member is disposed over the interleaved members, so as to position portions of the second U-shaped member against a second pair of box interior sides.

According to further teachings, the insulative packaging system above further contains three fiber pads disposed within a polymer sleeve. The polymer sleeve is sealed at its ends and tacked together at locations between the fiber pads.

According to further teachings, a packaging system for bottles is disclosed. The system has a member defining a plurality of elongated bottle accepting cavities. Disposed about the member is a plurality of insulating planar pads. Each planar pad is disposed within a closed polymer envelope. Surrounding the polymer envelope and the member is a corrugated box.

Other and further objects of the present invention will become apparent from the following detailed description of the invention when taken in conjunction with the appended drawings.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
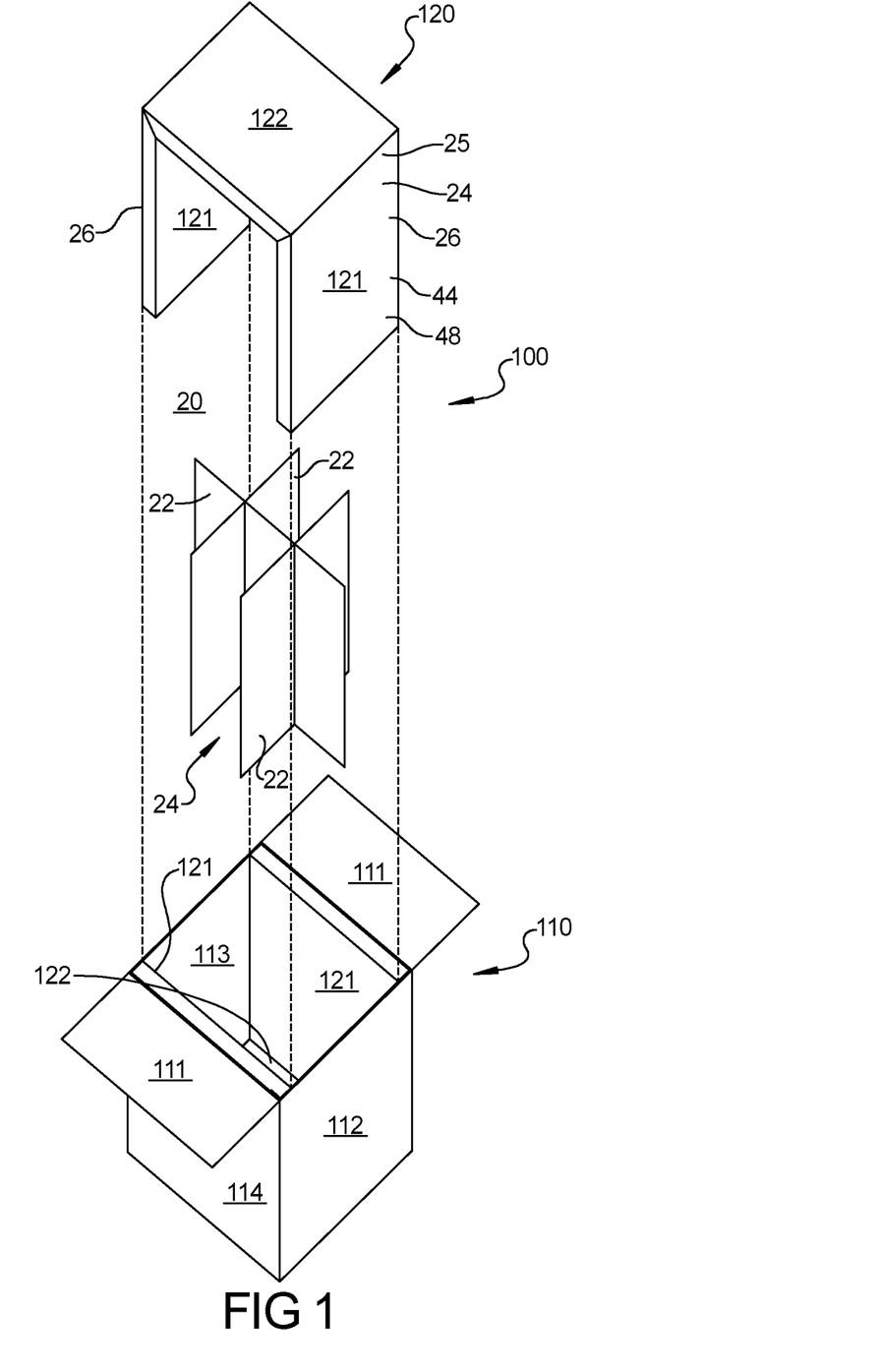
FIG. 1 is a diagrammatic perspective view of a bottle shipping container according to the present teachings.
Figure 2:
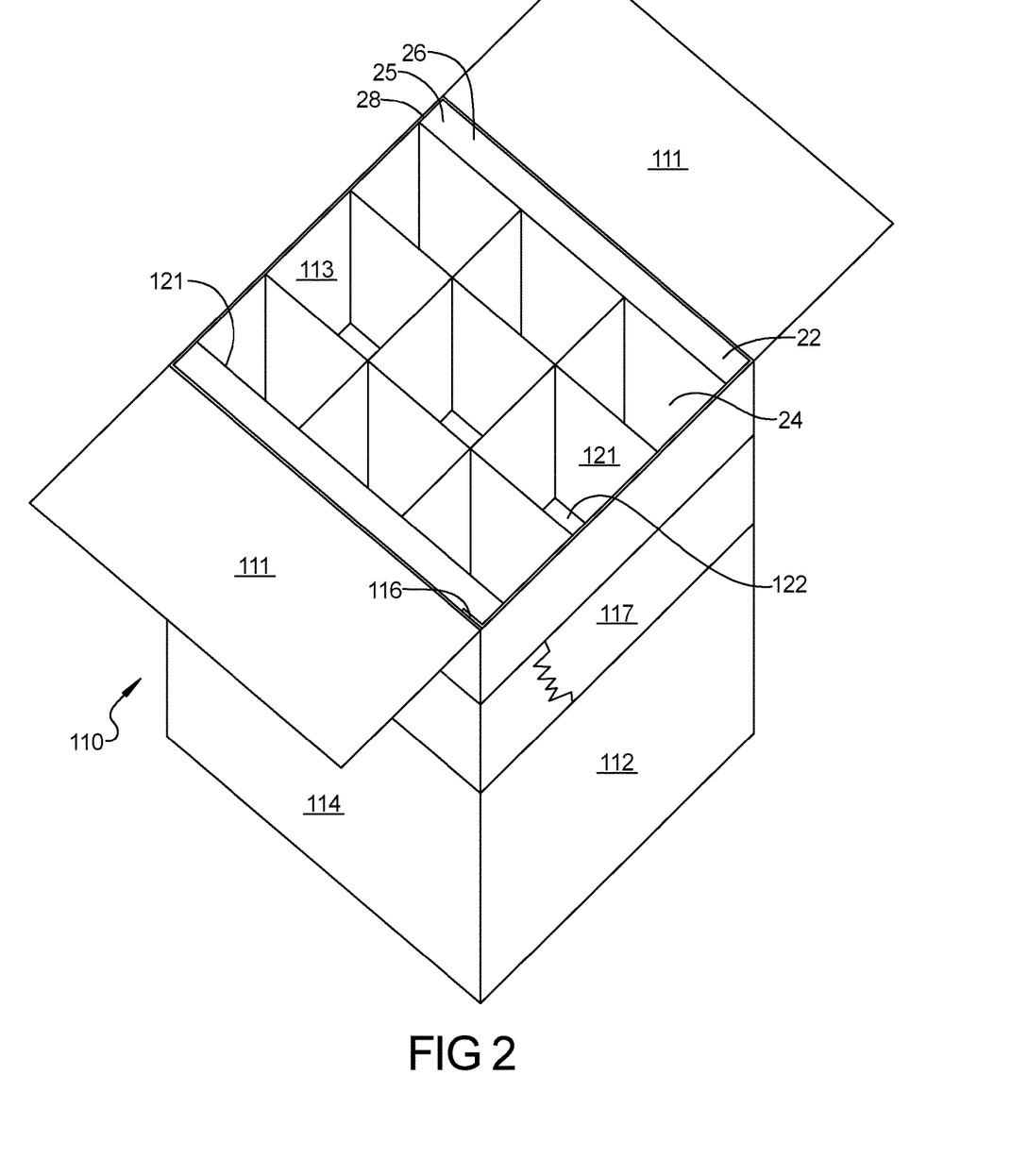
FIG. 2 is a diagrammatic perspective view of a three-segment insert according to the invention which surrounds interleaved panels.
Figure 3:
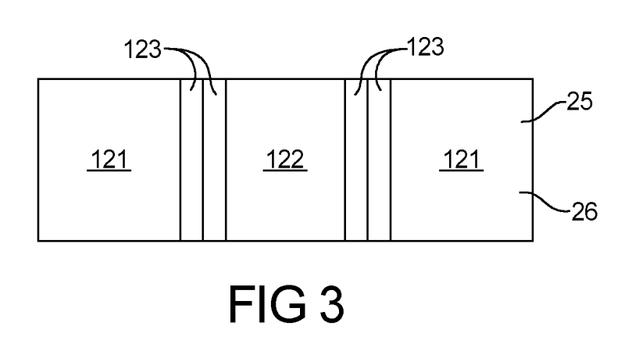
FIG. 3 is a top view of a four-segment insert.
Figure 4:
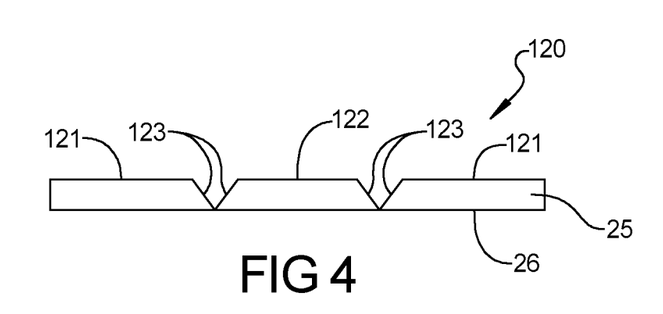
FIG. 4 is a side view of a three-segment insert.

FIGS. 1 and 2 show an embodiment of a container 100 that ships to the user flat and includes a box 110. The box 110 in the flat condition is like the box 110 shown in FIG. 1, but collapsed. Panels 125-130 are formed to complement the sides of the box 110. The panels 125-130 have mitered joints. The panels 125-130 can be adhered to faces 111-115 of the box 110. Glue is an example of a suitable adhesive to adhere the panels 125-130 to the box 110. When the box 110 is folded, the panels 125-130 move with the box 110 into engagement with each other to form an insulated inner layer within the box 110. The inner layer can be air-tight.

In FIGS. 1 and 2, an insulative packing system 20 for bottles is shown. The system 20 contains a plurality of corrugated members 22 that interleave to form a plurality of bottle holding cavities 24. The system 20 utilizes an insulative panel 25 formed of an insulative pad 28 disposed within a polymer film sleeve 26. The insulative panel 25 is disposed around the bottle holding cavities 24. The insulative pad 28 has chopped fibers selected from the group polyester, nylon, acrylic, cotton, polypropylene, denim and combinations thereof. The insulative pad 28 is disposed within an interior surface of the polymer film sleeve 26 being attached to the pad 28. The insulative pad 28 has powder antimicrobials while the polymer film sleeve 26 has biodegradable enhancers added therein.

The system 20 can be composed of materials that are 100% biodegradable. The outer surface of the polymer film sleeve 26 can consist of a non-petroleum based, biodegradable film or paper 48 that is also waterproof. Optionally, the polymer film sleeve 26 extends laterally so its lateral edges or margins can be heat sealed together. The bottom of the polymer film sleeve 26 is joined.

The inner surface of the polymer film sleeve 26 can be a non-petroleum based, biodegradable film or paper (substrate) 44 that is permeable. Sandwiched between the inner biodegradable film or paper (substrate) 44 and the outer film 48, and sealed on all sides, is the biodegradable insulative pad 28, which is made from re-cycled, purified, ground-up material to which super absorbent powders (for the absorption of spills), and antimicrobial powders (for the prevention of contamination in case of rupture for such products as blood or vaccines, etc.) have been added during manufacture. The antimicrobials are programmed to expire, after a pre-selected desired length of time, to allow for the eventual, natural, degradation/biodegradability of the mailer.

The outer surface of the polymer film sleeve 26 is encompassed within the water-proof, biodegradable film or paper 12, sealed on two (or three) sides with polymer film sleeve 26, which extends laterally coextensive with film 12. Polymer film sleeve 26 may not surround the insulative pad 28 completely, and end portions of the polymer film sleeve 26 extend around the insulative pad 28 sufficiently to enable the end portions to be sealed with the film 12.

The polymer film sleeve 26 can be stitched together with the insulative pad 28 in the following manner. A row of smaller stitches or heat produced couplings extend from top to bottom of the system 20 along each side thereof juxtaposed adjacent to the lateral edges of insulative panel 25. Spaced slightly inwardly of stitches, is a second row of larger stitches that encompass the insulative pad 28 and the polymer film sleeve 26 on the inside of the insulative pad 28 and include portions on the outside of the insulative pad 28. The second rows of stitches only extend longitudinally from the top of the mailer downwardly and terminate with the portions on the outside of the insulative pad 28. Apart from the stitching and heat-staking of the polymer film sleeve 26 to film 12, insulative pad 28 is not attached to film 12.

The insulative pad 28, as duly noted, can be made from re-cycled, purified, ground-up material to which super absorbent powders (for the absorption of spills), and antimicrobial powders (for the prevention of contamination in case of rupture for such products as blood or vaccines, etc.) have been added during manufacture. The antimicrobials are programmed to expire, after a pre-selected desired length of time, to allow for the eventual, natural, degradation-biodegradability of the mailer.

As evident from the above description, the insulative pad 28 is covered by and disposed within a cavity defined by the polymer film sleeve 26 on the inside with polymer film sleeve 26 extending laterally beyond the insulative pad 28 to lie coextensive with the marginal edges of the film 12 so all marginal edges can be heat sealed together. Polymer film sleeve 26 extends around the longitudinal extremities of the insulative pad 28 so that the end portions of the polymer film sleeve 26 lie between the insulative pad 28 and the outer film 12 when the insulative pad 28 is located in the system 20. These end portions enable the polymer film sleeve 26 to be heat sealed together with the film 12 around the mailer opening, thereby entrapping the insulative pad 28.

The film is preferably a biodegradable polymer as defined by ASTM 1991, and is preferably biodegradable in 9 months to 5 years either anaerobically and aerobically. The film can be manufactured as a 3-layer construction. In this regard, each layer can be manufactured with a biodegradable additive from ECM Biofilms, Inc. of Painsville, Ohio 44077. Optionally, the inner and outer layer can be colored with colors such as white or silver. The inside layer can be laminated to the pad material using an adhesive or thermal bonding. The layered structure can be perforated and have an inner nylon core and low-density polyethylene skin. Optionally, this laminate structure can be formed using a molten material force fed through a die and subsequently cooled.

The insulative pad may be manufactured from any of a wide variety of textile compositions comprising, for example, polyester, nylon, acrylic, cotton, polypropylene, denim etc., or combinations thereof, including both natural and man-made fibers. Randomly distributed textile and binder fibers having lengths between $\frac{1}{16}$ inch to 1.5 inches and a denier of between 5 and 12 may be used to form a textile fiber batt, which may be processed to form the insulative pad.

In one embodiment, two insulative pads are bonded to a biodegradable polymer layer to form an insulative construction. The insulative construction may be used as an insulative layer within a shipping container that can be formed of a polymer, paper, or cardboard material. There are several ways to make the insulative pad. In the first, the insulative pad can be formed of a textile fiber batt containing textile and binder fibers. The fiber batt is heated in an oven and compressed to form the insulative pad. Optionally, the insulative pad can be formed using needle setting technology.

Optionally, several layers of enveloped insulative pad can be used to form the construction. Each insulative pad within the system may be of equal thickness, or may be of unequal thickness. It is envisioned the insulative pad can have a thickness of about $\frac{1}{16}$ of an inch or greater. The starting insulative pad may be split longitudinally to provide two, three or more partial thickness pads. Optionally, the fibers can include thermoplastic binder fibers and reinforcement fibers are laid randomly yet consistently in x-y-z axes. The reinforcement fibers are generally bound together by heating the binder fibers above their glass transition temperature.

Typically, less than about 20% by weight binder fiber is used, and preferably about 15% binder fiber is used to form the insulative pad.

Thermoplastic binder fibers are provided having a weight of less than 0.2 pounds per square foot and, more particularly, preferably about 0.1875 pounds per square foot. The remaining reinforcement fiber is greater than 0.8 pounds per square foot, and preferably 1.0625 pounds per square foot. The binder fibers are preferably a mixture of thermoplastic polymers that consist of polyethylene/polyester or polypropylene/polyester or combinations thereof.

The insulative pad may be formed by heating the textile fiber batt in the oven to a temperature greater than about 350° F. and, more preferably, to a temperature of about 362° F. Such heating causes the binder fibers to melt and couple to the non-binder fibers, thus causing fibers to adhere to each other and solidify during cooling. Upon cooling, the binder fibers solidify and function to couple the non-binder reinforcement fibers together as well as function as reinforcement themselves.

The textile fiber batt is compressed to form the insulative pad so it has a density of greater than about 10 pounds per cubic foot. For systems, the insulative pad preferably has a density of greater than about 10 pounds per cubic foot and, more preferably, about 13.3 pounds per cubic foot with a thickness of about ⅛ inch.

The insulating properties of the material are tested under ASTME90-97, ASTME413-87. The insulative pad preferably has a compression resistance at 25% of the original thickness of greater than about 20 psi and preferably about 23.2 psi, at 30% of greater than about 35.0 psi and preferably about 37.0 psi, and at 50% of greater than about 180 psi and preferably about 219 psi. Additionally, the compression set at a compression of 25% of the original thickness is less than 20%, and preferably about 18.8%, and the tensile strength is between about 60 and 80 pounds and, most preferably, about 78.4 pounds.

Phase-change materials (refrigerants/gel packs) used in the mailer can also biodegradable, making the entire shipping system cost-effective, environmentally-friendly, and socially-responsible. The insulative properties of the mailer are roughly equivalent to one-half inch of foam, thus, allowing for the savings of second-day shipping as opposed to the cost of overnight priority freight/delivery charges as is required with current mailer technology.

The textile pad can serves six purposes: 1) insulation; 2) padding/cushioning; 3) absorption; 4) antimicrobial action; 5) biodegradability and; 6) cost efficiency (in terms of initial cost as opposed to a foam-lined box, set-up/fulfillment labor expenses, storage space, with attendant charges, and in-bound and out-bound freight charges).

A specific example of a mailer according to the present invention is one that is 14.5 inches long, 10 inches wide, and has a 4.5 inch flap. The top opening is about 8.5 inches across and can be opened to about 5 inches, thereby facilitating loading.

Examples of the materials used for the mailer are as follows. Tri-extruded degradable sheeting can be used as a film. The film is manufactured as 37" lay flat at 0.004 inches. Grass green, opaque tri-extruded degradable sheeting can be used for polymer film sleeve 26. The sheeting is manufactured with a degradable additive in all layers. The film is manufactured as 12" lay flat at 0.0015 inches. For the film 12, a white opaque outside/silver-color inside tri-extruded degradable sheeting can be used. The sheeting is manufactured with a degradable additive in all layers. The film is manufactured as 12" lay flat at 0.004 inches. The films are obtainable commercially from a variety of suppliers.

An example of the sealing tape 18 is BP-1052 SIS block co-polymer rubber, obtainable from DarTape Technologies Corporation. Biodegradable materials are commercially available from ECM Biofilms, Inc., Painesville, Ohio. Incorporation of at least 1% of the ECM Masterbatch pellets will assure biodegradation. Antimicrobial materials useable are Lurol AM-7 obtainable from Goulston Technologies, Inc. of Monroe, N.C. The insulative pad 28 was made using new textile clippings mixed with commercially available antimicrobial and super-absorbent powders (such as carboxymethylcellulose), and then processed through a web forming operation to produce a pad or batten about 15 mm or 0.6 inches thick. Film 12 can be from about 2 mils thick to about 6 mils thick, and preferably about 4 mils thick. Polymer film sleeve 26 can be from about 0.5 mils thick to about 5 mils thick, and preferably about 3 mils thick. Insulative pad 28 can be from about 5 mm thick to about 25 mm thick, and preferably about 15 mm thick.

Optionally, the absorbent material can be incorporated into the batting material prior to the binding of the fibers. Optionally, the absorbent material can be sodium polyacrylate in the form of a white powder. The sodium polyacrylate can have a pH of 5.5-6.5, a melting point of >390° F., and a specific gravity of 0.4-0.7 g/ml.

To support the bottles being shipped, the corrugated members 22 interleave to form the bottle holding cavities 24. The flat members can have notches defined therein so as to allow the interleaving of the flat members 22. Three interleaved members can form six cavities, four interleaves members 22 can for nine cavities and five interleaved members can be used to form six cavities. The insulative panel 25 is disposed about the side regions of the bottle holding cavities 24. In addition to being positioned on the side regions of the bottle holding cavities, the insulative pads are positioned at the top and bottom of the plurality of corrugated members 22. It is envisioned an additional square pad can be interference fit into the pad wrapped around the sides of the interleaved members.

Figure 5:
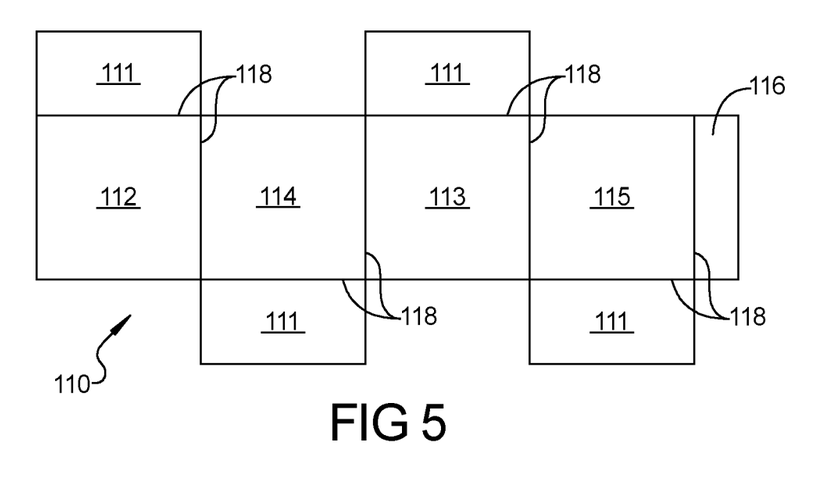
FIG. 5 is a top view of a sheet that can be folded into a box.

FIG. 5 shows a sheet that can be folded into the box 110. The sheet includes a row of four rectangular segments: front 112, right 114, back 113, and left 115. Flaps 111, which will form the top when folded, extend from a top edge of the row of segments 112, 114, 113, and 115. Flaps 111, which will form the bottom when folded, extend from a bottom edge of the row of segments 112, 114, 113, and 115. A tab 116 is included on one edge and is used during assembly of the box 110 from the sheet. Fold lines 118 are disposed between the flaps 111, the segments 112-115, and the tab 116.

According to the present teachings, an insulative packaging system has a shipping container, a plurality of corrugated members that interleave to form a plurality of bottle holding cavities, a three layered polymer film laminate container having an interior surface, and a textile padding disposed within the polymer film laminate container. The textile pad is disposed within the container and the polymer film and is formed of chopped fibers selected from the group polyester, nylon, acrylic, cotton, polypropylene, denim and combinations thereof. The textile pad further has microbial and super-absorbent powders disposed adjacent to an exterior surface of the textile pad or within.

Disposed within the box 110 is a first U-shaped insulative member or three-segment insert 120 disposed against the box bottom and a first pair of box sides. Disposed above the insulative member 120 is a plurality of interleaved members which form a plurality of bottle holding cavities. A second U-shaped insulative member or three-segment insert 120 is disposed over the interleaved members, so as to position portions of the second U-shaped member against a second pair of box interior sides.

The three-segment insert 120 contains three fiber pads disposed within a polymer sleeve. The polymer sleeve is sealed at its ends and tacked together at locations between the fiber pads. As described below, disposed about the interleaved members which form a plurality of bottle holding cavities is a plurality of insulating planar pads. Each planar pad is disposed within a closed polymer envelope. Surrounding the polymer envelope and the member is a corrugated box.

FIGS. 1-4 show an embodiment of a panel of stiffened flocked material in to form the three-segment insert 120. The three-segment insert 120 is made from the stiffened flocked material described previously. The three-segment insert 120 includes three panels 121, 122, and 121 configured in a row. Each segment 121 or 122 is configured to overlay a respective inner surface of the box 110. A miter joint 123 is formed between each segment 121, 122, and 121.

As shown in FIGS. 1-4, three-segment inserts 120 can be used with the box 110 to form a container 100. First, the box 110 is assembled. Tape 117 can be added around the box 110 to secure the box 110 in its folded shape. Next, a three-segment insert 120 is folded from its unfolded flat form shown in FIGS. 3 and 4 into a folded U-shaped form shown in FIG. 1. As shown in FIG. 2, a first folded three-segment insert 120 is inserted into the box 110. The first leg 121 overlies the right of the box 110. The base 122 overlies the bottom of the box 110. The second leg 121 overlies the left of the box 110. The U-shape member is placed with the base 122 on the bottom of the box 110 to allow a second U-shaped member to be inserted. Next, as shown in FIG. 1, a second three-segment insert 120 is folded into a U-shape and inserted into the box 110. A first leg 121 of the second insert 120 overlies a back 113 of the box 110. A top 122 of the second insert 120 overlies a top (i.e., folded flaps 111) of the box 110. When the two U-shaped members 120 are inserted within the box 110, an insulated container is formed. The walls of the U-shaped members 120 are sized to contact each other to prevent air from being able to penetrate the insulated layer.

Figure 6:
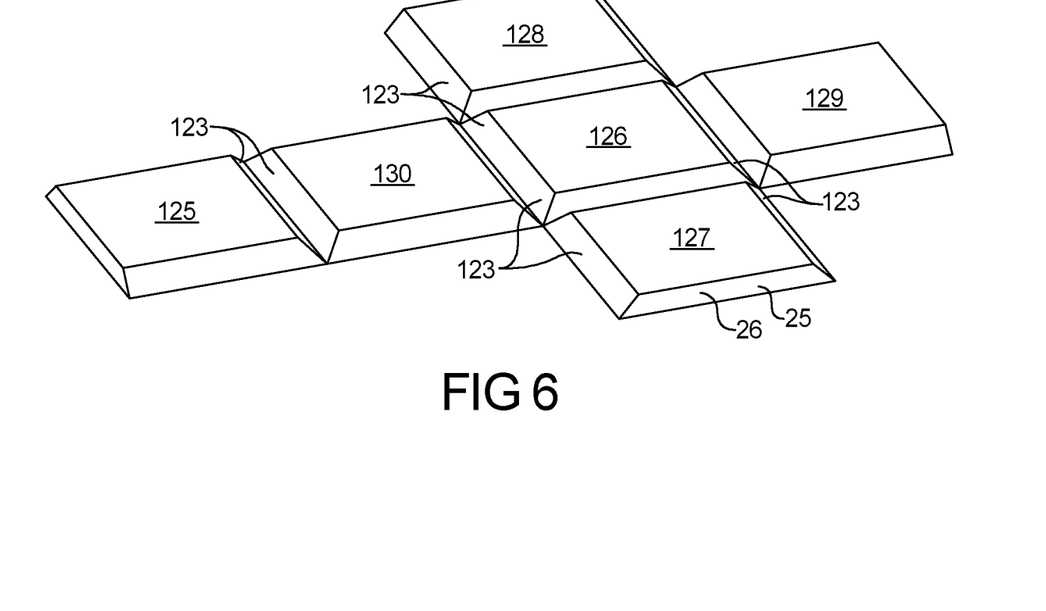
FIG. 6 is a perspective view of a cross-shaped six-panel insert with mitered joints.
Figure 7:
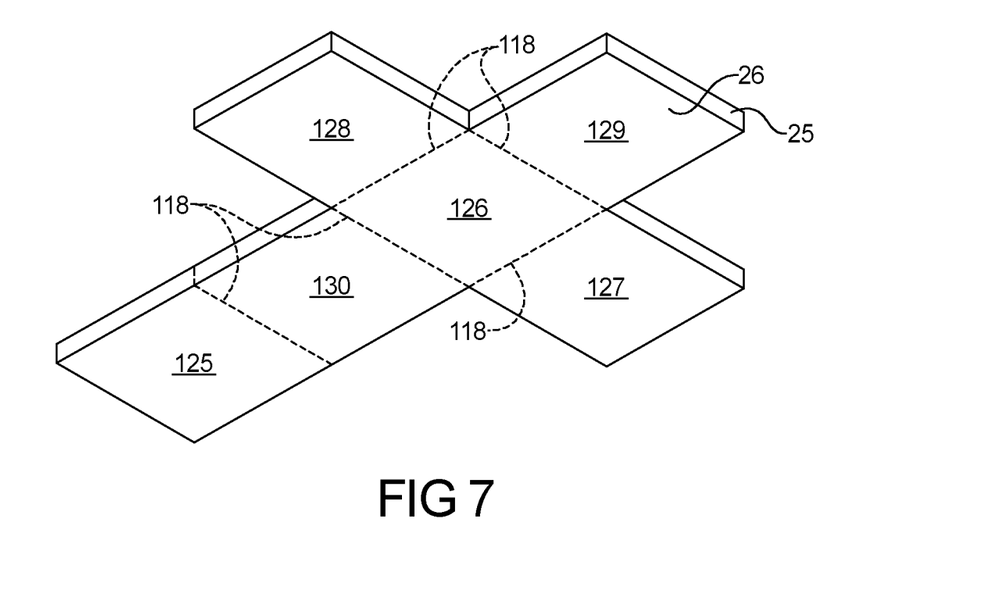
FIG. 7 is a perspective view of a cross-shaped six-panel insert with scored joints.

FIGS. 6 and 7 show two cross-shaped embodiments, which are referred to as six-panel inserts 124, of panels of stiffened flocked material. The panels take the form of four panels 125, 130, 126, 129 aligned in a column and a row of three panels 126, 127, and 128 (i.e., two laterally opposed panels 127 and 128 extending from the top and bottom edges of the second panel 126 in the column). In the embodiment shown in FIG. 6, the panels 125-130 have miter joints 123 between them. In the embodiment shown in FIG. 7, the panels 125-130 have scores 130 between them to assist in folding.

Figure 9:
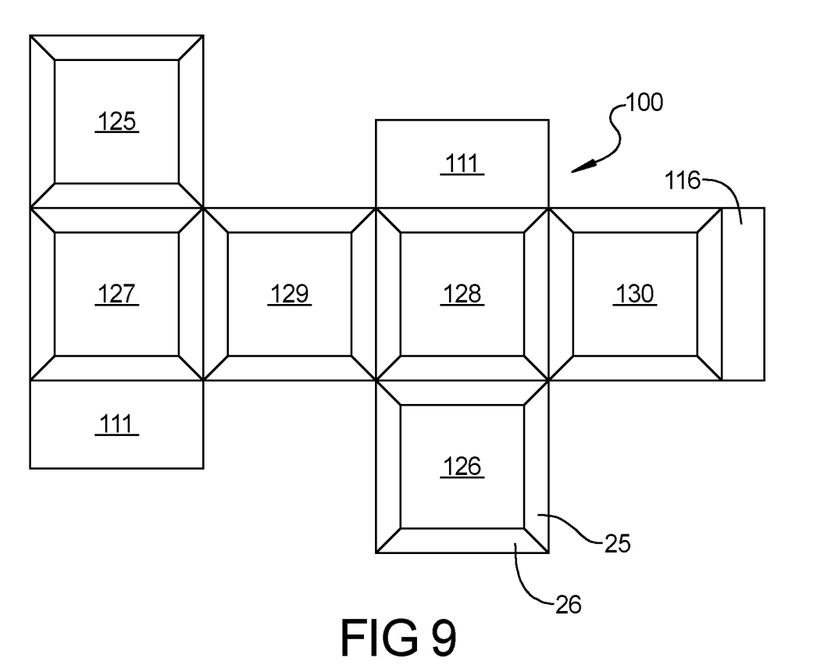
Figure 10:
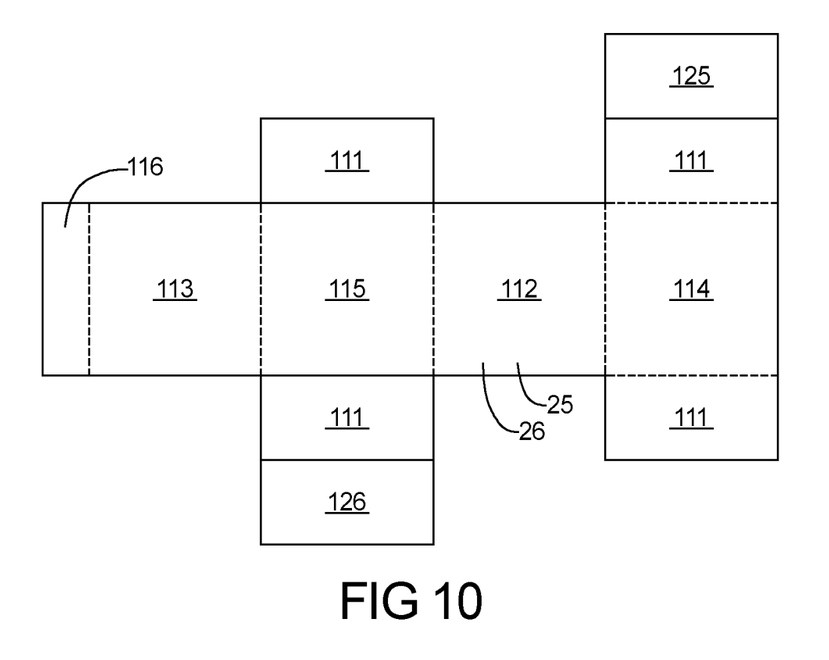

The embodiment shown in FIGS. 9-10 can be shipped flat (as shown in FIGS. 9-10) to the user. Then, the user can fold the six-panel inserts 124 into a box shape. The folded six-panel insert 124 is placed within the box 110. The size of the panels 125-130 are configured to overlap corresponding panels 111-115 of the box 110, as shown in FIG. 10.

Figure 8:
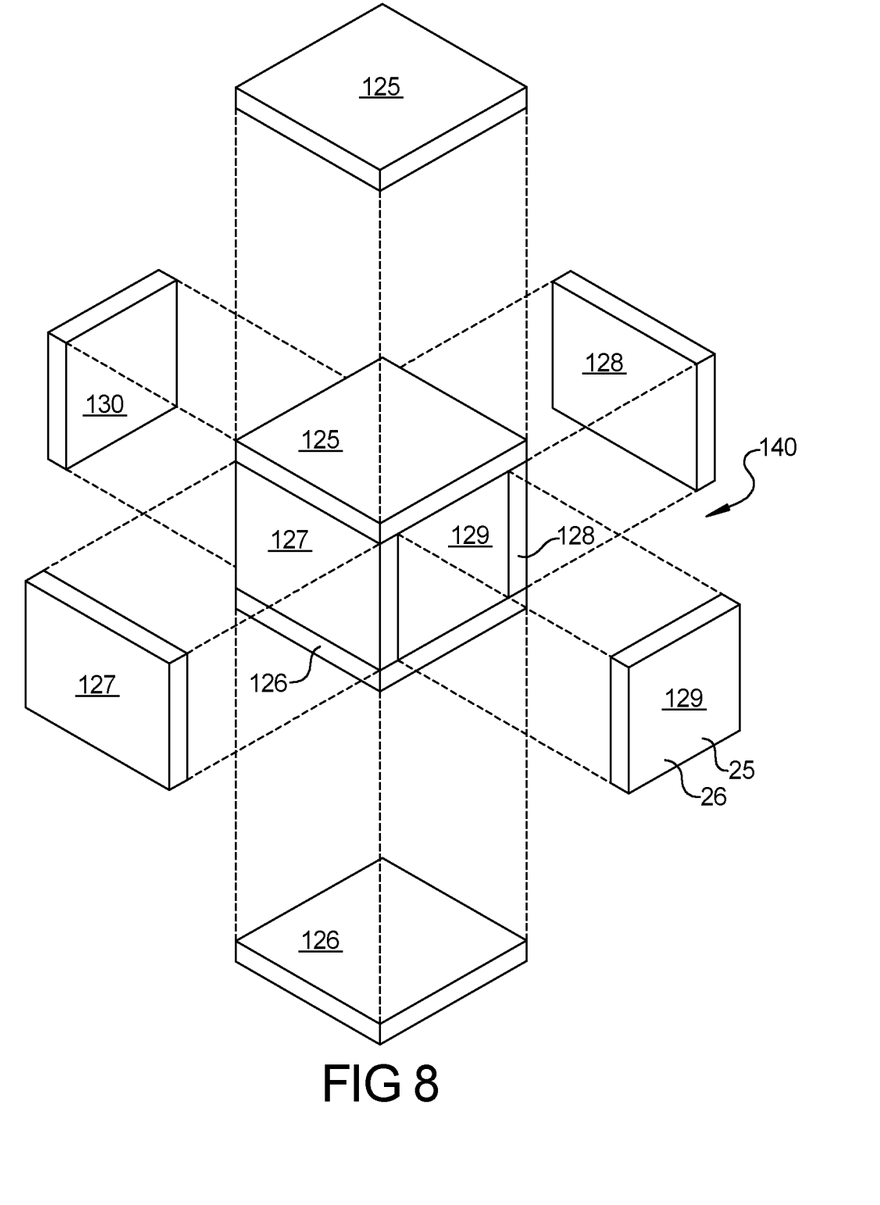
FIGS. 8-10 are alternate insulative pads.

FIG. 8 shows a six-panel insert 140. The six-panel insert is made from six separate panels 125-130. The panels 125-130 correspond to the faces 111-115 of the box 110. The panels 125-130 are inserted within the box and overly the interior of the faces 111-115. The panels 125-130 contact each other to form an insulated layer and compartment within the box 110.

Figure 11:
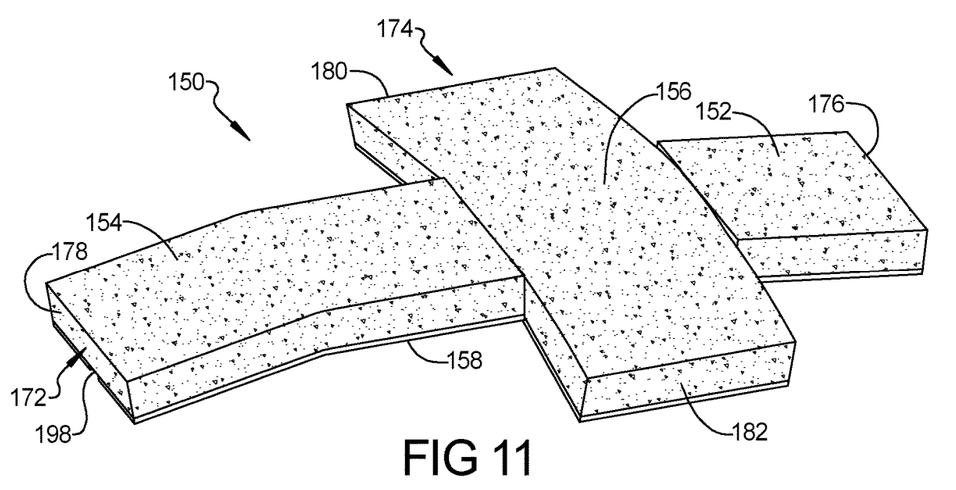
FIG. 11 is a top perspective view of a cross-shaped six-panel insert with a strengthening inner layer.
Figure 12:
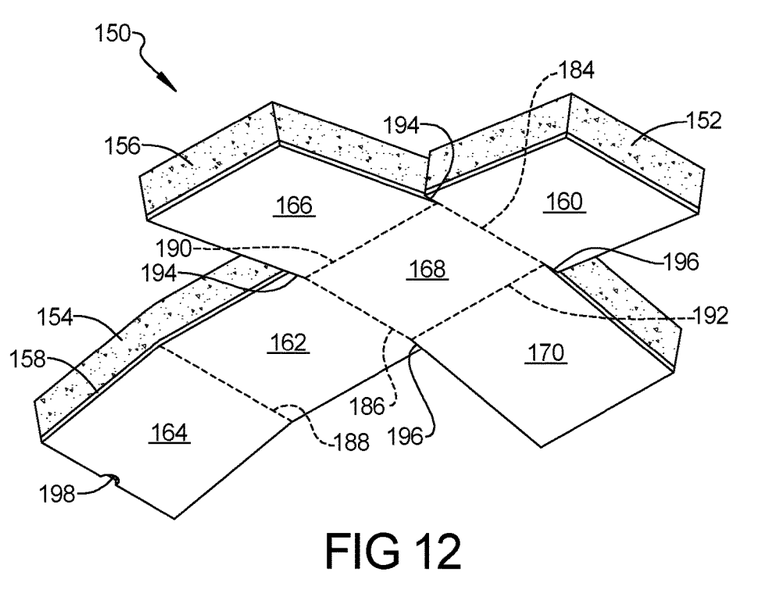
FIG. 12 a bottom perspective view of the insert of FIG. 11.

FIGS. 11 and 12 show a one-piece insulative insert 150 including a first pad 152 of the stiffened flocked material, a second pad 154 of the stiffened flocked material, a third pad 156 of the stiffened flocked material, and a strengthening inner layer 158. The first, second, and third pads 152, 154, and 156 are joined to the inner layer 158 using, for example, an adhesive. The inner layer 158 is formed from a material that is stronger than the stiffened flocked material. In one example, the inner layer 158 is formed from corrugated paper. Thus, when the first, second, and third pads 152, 154, and 156 are joined to the inner layer 158, the inner layer 158 improves the strength of the insert 150 relative to the strength of the insert 150 without the inner layer 158. As a result, the strength of a box used with the insert 150, such as a box 200 shown in FIG. 13, may be reduced relative to the strength of a box used with an insert that is similar to the insert 150 but does not include the inner layer 158. For example, due to the inner layer 158, a single-wall box may be used with the insert 150 as opposed to a double-wall box (i.e., the box 200 may be a single-wall box as opposed to a double-wall box).

The insert 150 is a six-panel insert including six interlinked panels that form a cross configuration similar to that shown in FIGS. 6 and 7. The interlinked panels include a first panel 160, a second panel 162, a third panel 164, a fourth panel 166, a fifth panel 168, and a sixth panel 170. Each of the panels 160-170 may have a rectangular shape and/or all of the panels 160-170 may have the same width and/or the same length. The first, second, third, and fifth panels 160, 162, 164, and 168 are aligned with one another and are arranged in a straight row, with at least one of end of each of the aligned panels being attached to an end of another one of the aligned panels. The fourth and sixth panels 166 and 170 are offset relative to the straight row and are attached to opposite sides of the fifth panel 168.

The first pad 152 may have a first length L1, the second pad 154 may have a second length L2, and the third pad 156 may have a third length L3. The first pad 152 may form the insulative portion of the first panel 160, the second pad 154 may form the insulative portions of the second and third panels 162 and 164, and the third pad 156 may form the insulative portions of the fourth, fifth, and sixth panels 166, 168, and 170. Thus, the second length L2 may be two times greater than the first length L1, and the third length L3 may be three times greater than the first length L1.

The insert 150 includes a long section 172 and a short section 174 that intersects the long section 172 to form a cross shape. The long section has a first end 176 and a second end 178, and the short section 174 has a first end 180 and a second end 182. The long second 172 includes the first and second pads 152 and 154 and the fifth panel 168 of the third pad 156. The short section 174 includes the entire third pad 156, and therefore includes the fourth, fifth, and sixth panels 166, 168, and 170.

In various implementations, the first, second, and third pads 152, 154, and 156 of the stiffened flocked material may be replaced with fourth, fifth, and sixth pads of the stiffened flocked material. The fourth pad may form the entire insulative portion of the long section 172 of the insert 150, and therefore may include the first, second, third, and fifth panels 160, 162, 164, and 168. The fifth pad may form the insulative portion of the fourth panel 166, and the sixth pad may form the insulative portion of the sixth panel 170. Thus, each of the fifth and sixth pads may have a length (and/or width) that is equal to the first length L1, and the fourth pad may have a width that is four times greater than the first length L1.

The inner layer 158 includes various features that facilitate folding the insert 150 to fit within a box and removing the insert from a box. For example, the inner layer 158 includes a first fold line 184, a second fold line 186, a third fold line 188, a fourth fold line 190, a fifth fold line 192, a first pair of slits 194, a second pair of slits 196, and a semi-circular slot 198. The fourth and fifth fold lines 190 and 192 may be perpendicular to the first, second, and third fold lines 184, 186, and 188. The fold lines 184-192 may be formed by crimping the inner layer 158. Since crimping compacts material, the density of the inner layer 158 at the fold lines 184-192 may be greater than the density of the remainder of the inner layer 158. The slits 196, 198 and the semi-circular slot 198 may be formed by cutting or stamping the inner layer 158.

Figure 13:
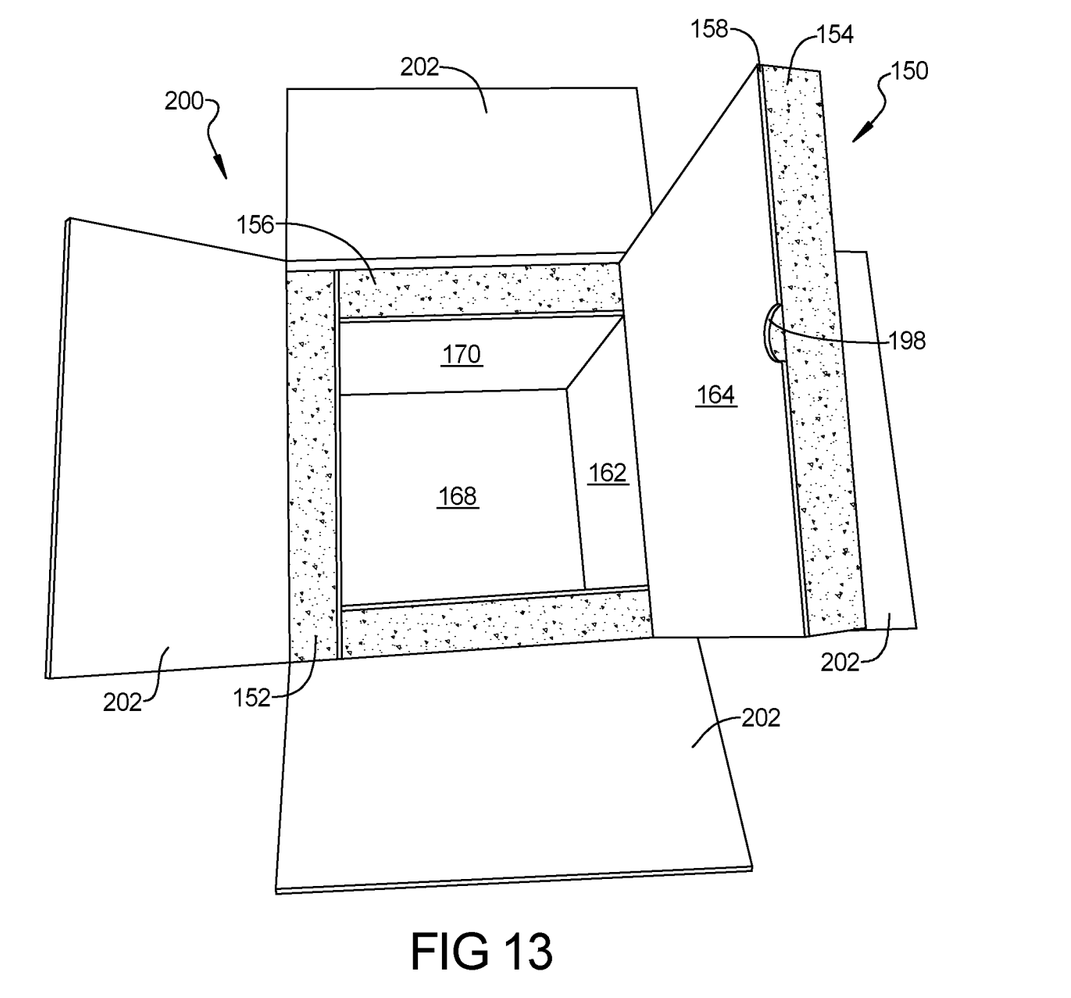
FIG. 13 is a perspective view of the insert of FIG. 11 folded and placed inside of a shipping container.

FIG. 13 shows the insert 150 placed within the cubical box 200 having six sides including a top, a bottom, and four sidewalls. The box 200 may be made from corrugated paper. The box 200 includes four flaps 202 that collectively form the top of the box 200. To rearrange the insert 150 from the shapes shown in FIGS. 11 and 12 to the shape shown in FIG. 13, the insert 150 is folded along the first, second, fourth, and fifth fold lines 184, 186, 190, and 192. The slits 194, 196 facilitate folding the insert 150 along the fourth and fifth fold lines 190 and 192.

Once the insert 150 is arranged as shown in FIG. 13 and placed within the box 200, an item to be shipped may be placed within the interior of the insert 150. Then, the insert 150 may be folded along the third fold line 188 to fully enclose the item, and the flaps 202 of the box may be folded over the third panel 164 of the insert 150 to form the top of the box 200 and thereby close the box 200. To remove the item from the box 200, the flaps 202 of the box 200 may be unfolded to their positions shown in FIG. 13, and the third panel 164 of the insert 150 may be unfolded to its position shown in FIG. 13 using the semi-circular slot 198. More specifically, the semi-circular slot 198 enables one to insert a finger past the inner layer 158 (through the semi-circular slot 198) and to pull upward on the inner layer 158 to unfold the third panel 164 of the insert 150 and thereby provide access to the item in the box 200.

As indicated above, the inner layer 158 of the insert 150 enables the strength of the box 200 to be reduced while achieving the same overall strength as the box 200 with the insert 150 when the strength of the box 200 is not reduced and the insert 150 does not include the inner layer 158. For example, when the insert 150 includes the inner layer 158, the box 200 made be made from single-wall corrugated paper instead of double-wall corrugated paper. In addition, the cross configuration shown in FIGS. 11 and 12 enables the insert 150 to lie flat for packaging and shipment thereof, and to fold into the cube-shape configuration shown in FIG. 13 for placement inside of the box 200. Further, the insert 150 may be preassembled so that packaging personnel need only fold the insert 150 for placement inside of the box 200 as opposed to, for example, attempting to join the inner layer 158 to the pads 152-156 inside of the box 200.

Samples of the inert 150 and the box 200 were tested using a box compression test procedure (TAPPI T804/ASTM D642) and a box puncture test procedure (TAPPI T803). The samples of the insert 150 included a die-cut, single-wall, C-flute corrugated paper laminated to a post-industrial, pre-consumer recycled textile pad. The samples of the insert 150 had inner dimensions of 7 inches (in.) by 7.5 in. by 7.75 in. The samples of the box 200 were made of Regular Slotted Carton (RSC), single-wall, C-flute corrugated paper and had outer dimensions of 10 in. by 10 in. by 10 in. The samples were conditioned at 73 degrees Celsius and 50% relative humidity prior to testing.

For the box compression test, the samples of the box 200 were tested both with and without the samples of the insert 150 placed therein. When the samples of the box 200 were tested without the insert 150 placed therein, the samples of the box 200 withstood an average peak load of 506.6 pounds-force (lbf) and an average deflection at peak load of 0.313 in. When the samples of the box 200 were tested with the insert 150 placed therein, the samples of the box 200 withstood an average peak load of 635.3 pounds-force (lbf) and an average deflection at peak load of 0.618 in. Thus, the insert 150 increased the average peak load of the box 200 by 128.7 lbf or 25 percent (%), and the insert 150 increased the average deflection at peak load by 0.305 or 97%.

For the box puncture test, samples of the insert 150 were tested without the box 200 and with impact to the corrugated paper, samples of the insert 150 were tested without the box 200 and with impact to the textile pad, and the samples of the box 200 were tested with the insert 150 placed therein and with impact to the box 200. The insert 150 had a puncture energy of 3.00 Joules (J) with impact to the corrugated paper, the insert 150 had a puncture energy of 8.88 J with impact to the textile pad, and the box 200 had a puncture energy of 8.40 J with the insert 150 placed therein and with impact to the box 200.

Samples of the insert 150 were also tested to evaluate the compression resistance and compression force deflection (CFD) of the insert 150 when the textile pad is facing upward and when the textile pad is facing downward. Compression resistance is the pressure required to compress a sample by a certain percentage (e.g., 25% or 50%), and compression resistance is measured immediately after the compression force is applied. CFD is the pressure required to compress a sample by the certain percentage, and CFD is measured some period (e.g., 60 seconds) after the compression force is applied.

When the textile pad is facing upward and the insert 150 is compressed by 25% relative to its original state, the insert 150 has a compression resistance of 0.780 pounds per square inch (psi) and a CFD of 0.586 psi. When the textile pad is facing upward and the insert 150 is compressed by 50% relative to its original state, the insert 150 has a compression resistance of 2.14 psi and a CFD of 1.55 psi. When the textile pad is facing downward and the insert 150 is compressed by 25% relative to its original state, the insert 150 has a compression resistance of 0.730 psi and a CFD of 0.561 psi. When the textile pad is facing downward and the insert 150 is compressed by 50% relative to its original state, the insert 150 has a compression resistance of 2.12 psi and a CFD of 1.55 psi.

Samples of the inert 150 were also tested using ASTM C518-17 to evaluate the steady state thermal transmission properties thereof. The samples tested included a first sample having a thickness of 33.2 millimeters (mm) (1.309 in.), a second sample having a thickness of 31.7 mm (1.248 in.), and a third sample having a thickness of 22.3 millimeters (0.879 in.). Each of the first, second, and third samples included a piece of cardboard adhered to one face thereof and having a thickness of 3.2 mm (0.125 in.).

The first sample exhibited an average thermal resistance of 0.813 Kelvins meter squared per Watts (K·m2/W) and an R-value of 4.6. The second sample exhibited an average thermal resistance of 0.662 K·m2/W and an R-value of 3.8. The third sample exhibited an average thermal resistance of 0.559 K·m2/W and an R-value of 3.2.

The test results set forth above are only example values of the corresponding properties of the insert 150 and the box 200, and may define a range of acceptable values for the insert 150 and the box 200. For example, the insert 150 and the box 200 may have properties that are greater than or equal to the values set forth above and/or less than or equal to the values set forth above. In another example, the insert 150 and the box 200 may have properties that are within a predetermined range (e.g., 5%, 10%, 20%, 30%, 40%, 50%) of the values set forth above. In addition, relationships may be drawn between the properties of the samples and the corresponding test results, and those relationships may be used to determine other example values of the properties of the insert 150 and the box 200.

Example embodiments are provided so that this disclosure will be thorough, and will fully convey the scope to those who are skilled in the art. Numerous specific details are set forth such as examples of specific components, devices, and methods to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the invention has been described in terms of preferred embodiments, changes can be made which do not depart from the inventive concept. Such changes are deemed to fall within the purview of the appended claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An insulative insert for a shipping container, the insulative insert comprising:
    at least one insulative pad comprising fibers of material selected from a group consisting of polyester, nylon, acrylic, cotton, polypropylene, denim and combinations thereof; and
    an inner layer adhered to the at least one insulative pad to form a plurality of interlinked insulative panels, each of the plurality of interlinked insulative panels having a pair of opposing ends and a pair of opposing sides that are perpendicular to the ends, the plurality of interlinked insulative panels including at least four aligned panels and at least two offset panels, the aligned panels being arranged in a straight row with at least one of the ends of each of the aligned panels being attached to the end of another one of the aligned panels, the offset panels extending from opposite sides of one of the aligned panels, the plurality of interlinked insulative panels forming a cross shape in an unfolded position, the plurality of interlinked insulative panels forming a cubed structure in a folded position, wherein:
    when the plurality of interlinked insulative panels are in the folded position and an item is located within the cubed structure, the inner layer faces the item;
    the inner layer includes a plurality of fold lines for folding the insulative insert into the folded position;
    insulative insert includes aligned panels and offset panels, the aligned panels being aligned with one another and forming a long section of the cross shape, the offset panels being offset relative to the aligned panels and extending from one of the aligned panels to form a short section of the cross shape;

the plurality of fold lines include first fold lines disposed between adjacent ones of the aligned panels and second fold lines disposed between the offset panels and the one of the aligned panels from which the offset panels extend;

the second fold lines are perpendicular to the first fold lines; and the inner layer defines a pair of slits disposed at opposite ends of each of the second fold lines and extending parallel to the first fold lines to facilitate folding the insulative insert along the second fold lines.

2. The insulative insert of claim 1 wherein the at least one insulative pad is made from a first material, and the inner layer is made from a second material that is stronger than the first material.

3. The insulative insert of claim 1 wherein the inner layer is made from corrugated paper.

4. The insulative insert of claim 1 wherein the at least one insulative pad includes a plurality of insulative pads that are each adhered to the inner layer.

5. The insulative insert of claim 4 wherein the plurality of insulative pads includes a first insulative pad, a second insulative pad, and a third insulative pad, the first and second insulative pads being aligned with one another, the third insulative pad extending between and perpendicular to the first and second insulative pads.

6. The insulative insert of claim 1 wherein the plurality of fold lines are disposed between the plurality of interlinked insulative panels.

7. The insulative insert of claim 1 wherein the at least one insulative pad has an inner surface, the inner layer being adhered to the inner surface of the at least one insulative pad and covering the entire inner surface.

8. An insulative insert for a shipping container, the insulative insert comprising:

at least one insulative pad formed from fibers of a first material having a first strength, the first material including at least one of cellulose and synthetic polymer; and an inner layer formed from a second material having a second strength that is greater than the first strength, the inner layer being joined to the at least one insulative pad to form the insulative insert, the insulative insert being configured to lie flat and form a cross shape in an unfolded position and to form at least three sides of a cube shape in a folded position, wherein:

when the insulative insert is in the folded position and an item is disposed within the insulative insert, the inner layer faces the item;

the inner layer includes a plurality of fold lines for folding the insulative insert into the folded position;

the insulative insert includes aligned panels and offset panels, the aligned panels being aligned with one another and forming a long section of the cross shape, the offset panels being offset relative to the aligned panels and extending from one of the aligned panels to form a short section of the cross shape;

the plurality of fold lines include first fold lines disposed between adjacent ones of the aligned panels and second fold lines disposed between the offset panels and the one of the aligned panels from which the offset panels extend;

the second fold lines are perpendicular to the first fold lines; and the inner layer defines a pair of slits disposed at opposite ends of each of the second fold lines and extending parallel to the first fold lines to facilitate folding the insulative insert along the second fold lines.

9. The insulative insert of claim 8 wherein the first material includes cellulose selected from a group consisting of cotton, denim and combinations thereof.

10. The insulative insert of claim 8 wherein the first material includes synthetic polymer selected from a group consisting of polyester, nylon, acrylic, polypropylene, and combinations thereof.

11. The insulative insert of claim 8 wherein the second material includes corrugated paper.

12. The insulative insert of claim 8 wherein the short section intersects the long section to form the cross shape when the insulative insert is in the unfolded position, and the insulative insert forms six sides of the cube shape when the insulative insert is in the folded position.

13. The insulative insert of claim 12 wherein the at least one insulative pad includes a first pad, a second pad, and a third pad, the first pad extending the entire length of one of the short and long sections, the second and third pads being disposed on opposite sides of the first pad to form an insulative portion of the other one of the short and long sections.

14. The insulative insert of claim 8 wherein when the insulative insert is in the folded position and an item is disposed within the insulative insert, the insulative insert fully encloses the item.

15. An insulative insert for a shipping container, the insulative insert comprising:

at least one insulative pad comprising fibers of material selected from a group consisting of polyester, nylon, acrylic, cotton, polypropylene, denim and combinations thereof; and an inner layer comprising corrugated paper adhered to the at least one insulative pad to form the insulative insert, the insulative insert being configured to lie flat and have a cross shape when the insulative insert is in an unfolded position, the insulative insert configured to have a cube shape when the insulative insert is in a folded position, wherein:

when the insulative insert is in the folded position and an item is disposed within the insulative insert, the inner layer faces the item;

the inner layer includes a plurality of fold lines for folding the insulative insert into the folded position;

the insulative insert includes aligned panels and offset panels, the aligned panels being aligned with one another and forming a long section of the cross shape, the offset panels being offset relative to the aligned panels and extending from one of the aligned panels to form a short section of the cross shape;

the plurality of fold lines include first fold lines disposed between adjacent ones of the aligned panels and second fold lines disposed between the offset panels and the one of the aligned panels from which the offset panels extend;

the second fold lines are perpendicular to the first fold lines; and the inner layer defines a pair of slits disposed at opposite ends of each of the second fold lines and extending parallel to the first fold lines to facilitate folding the insulative insert along the second fold lines.

16. The insulative insert of claim 15 wherein the at least one insulative pad includes a plurality of insulative pads that each have a rectangular shape.

17. The insulative insert of claim 16 wherein the inner layer is a single piece of corrugated paper having a perimeter that defines the cross shape, and the plurality of insulative pads cover an entire outer surface of the inner layer when the plurality of insulative pads are adhered to the inner layer.

* * * * *